July 26, 1966  J. O. JORDAN  3,262,610
VOLUMETRIC METERING DEVICE
Filed Oct. 26, 1964  2 Sheets-Sheet 1
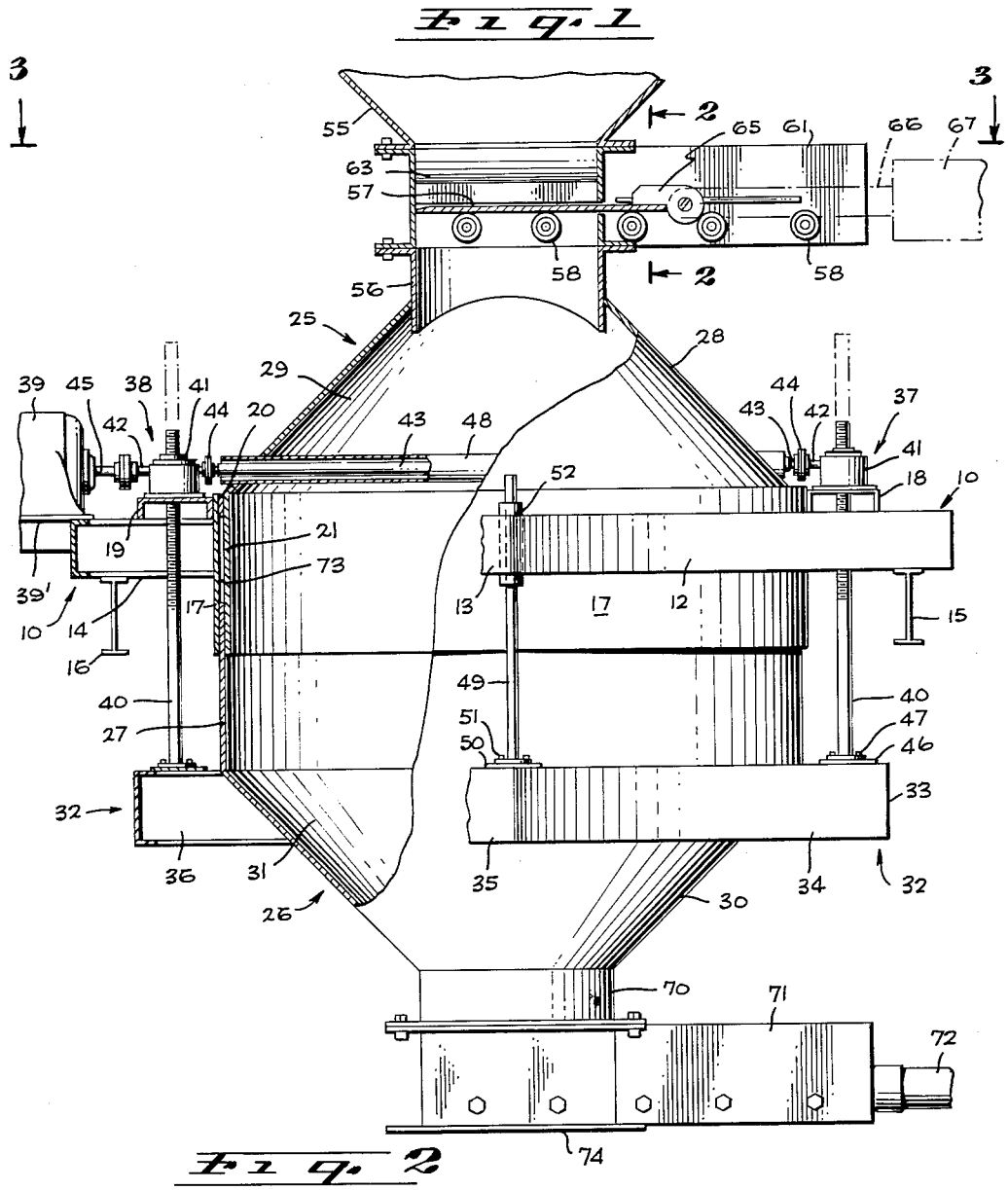
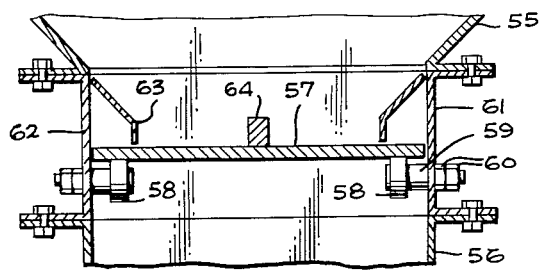
JAMES O. JORDAN
INVENTOR.
BY
Beehler & Arant
ATTORNEYS

JAMES O. JORDAN
INVENTOR.

BY

Beehler & Arant
ATTORNEYS

United States Patent Office 3,262,610
Patented July 26, 1966

3,262,610
VOLUMETRIC METERING DEVICE
James O. Jordan, La Habra, Calif., assignor to Temcor, Torrance, Calif., a corporation of California
Filed Oct. 26, 1964, Ser. No. 406,422
4 Claims. (Cl. 222—440)

The invention relates to the batch mixing of concrete and has particular reference to a device for measuring or metering quantities of one of the aggregates which go into the batch, namely a light weight aggregate consisting of any one of several currently popular artificial spongy materials.

For a very considerable length of time sand, gravel, cement, and water were considered the standard ingredients for a concrete mix. Since all of these ingredients and especially the sand and gravel aggregates are of a relatively high specific gravity, relatively few problems were encountered in proportioning the ingredients according to weight. More recently, relatively light weight concrete has been in demand and this has resulted in using as one of the aggregate materials one or another of the artificially blown or naturally light spongy materials of which perlite is a typical example. These materials however are so light in weight that they do not lend themselves readily to proportioning solely on a weight basis. The specific gravity is quite variable which results in a considerable fluctuation in the yield per cubic foot of material. If the yield is to be kept constant, then a constant running check must be kept upon the specific gravity of the light weight ingredient. Consequently, proportioning the ingredients by weighing has had many handicaps.

Although as a substitute metering of the ingredients and in particular the light weight ingredients by volume has become the preferred proportioning method. Volumetric metering devices heretofore available have not been dependable. This has been especially true where containers used have been open containers where no acceptable means has been devised for striking off the level of the light weight ingredient in order to make sure of a constant volume for each successive batch. Even on some occasions where it has been possible to work out equipment for repeating a fairly consistent volume measuring operation, there has been no readily available device of a kind which can be adjusted when desired to change the volume of the light weight material.

Further still, because of the low specific gravity, the light weight material and its powdery consistency on many occasions a considerable problem has been experienced due to dust and fine particles being stirred up thereby causing an unwanted amount of dirt on the premises as well as pollution of the atmosphere.

It is therefore among the objects of the invention to provide a new and improved volumetric metering device for light weight materials which is satisfactory for use in a batching process for concrete.

Another object of the invention is to provide a new and improved metering device for relatively light weight aggregate materials which is relatively precise and dependably accurate in its operation.

Still another object of the invention is to provide a new and improved volumetric metering device for relatively light weight aggregate materials which can be easily set at a specific volume and which at the same time can be easily held at the setting so that the volume will not vary from batch to batch.

It is also an object of the invention to provide in the device a means for easily and readily changing the setting of the device so that a new and different volume can be determined when a different mix is required.

Still another object of the invention is to provide a new and improved volumetric metering device for light weight aggregate which is of such design and construction that it can be worked in with standard equipment without necessitating changes in the latter, but more particularly one which because of its quick and accurate operation considerably shortens the batch cycle.

Still another object of the invention is to provide a new and improved volumetric metering device which is entirely contained thereby to avoid pollution of the atmosphere and accumulation of a detrimental amount of the powdered light weight aggregate on the premises.

Still another object of the invention is to provide a new and improved volumetric metering device for light weight aggregate material which is relatively simple in design and construction and also relatively inexpensive in view of the accuracy possible, there being needed relatively few special parts, thereby making the fabrication and employment of the device relatively inexpensive.

Still further among the objects of the invention is to provide a new and improved volumetric metering device for light weight aggregate material which is capable of accurate and repeated measurements of material irrespective of fluctuations in weight and which is sufficiently simple in its construction and operation to virtually eliminate errors of measurement which are often attributed to hand-operating devices of this general nature.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIGURE 1 is a side elevational view partially broken away showing the device in operative position and set for a selected measure of volume.

FIGURE 2 is a longitudinal sectional view on the line 2—2 of FIGURE 1.

Figure 3:
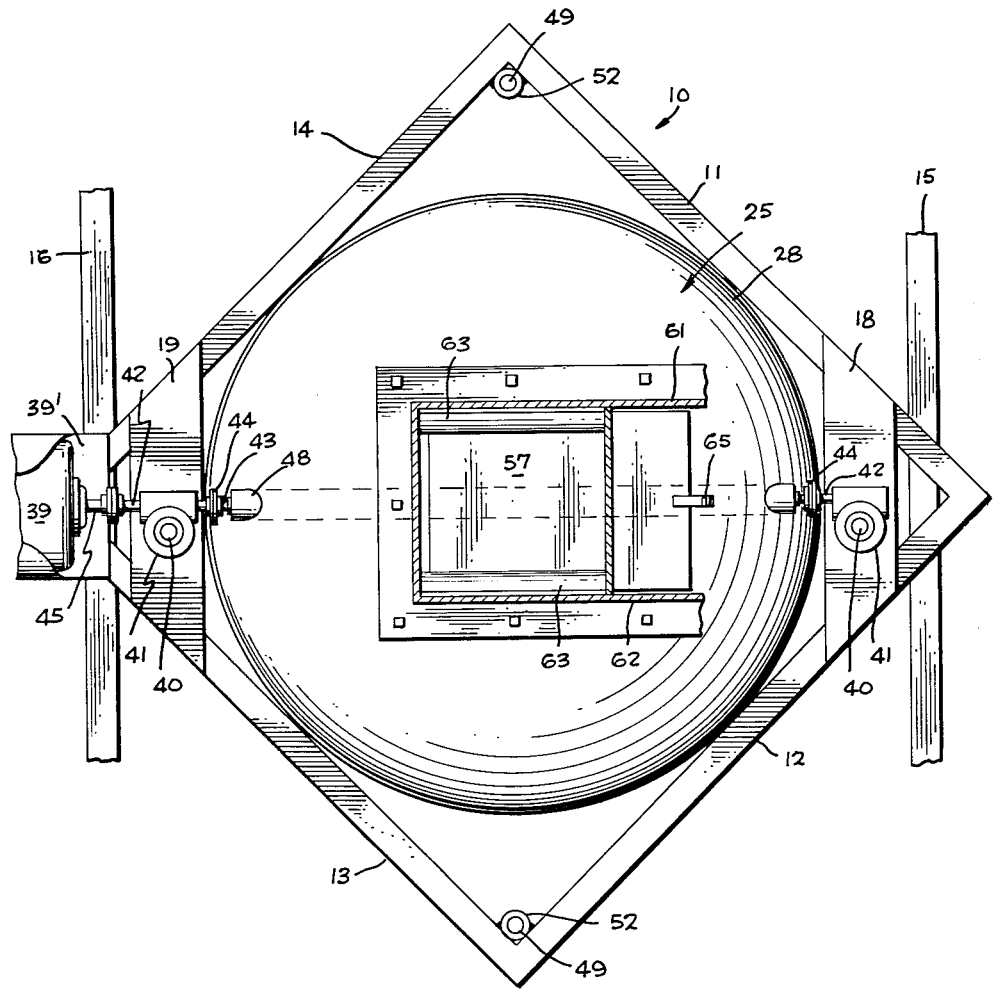
FIGURE 3 is a plan view taken on the line 3—3 of FIGURE 1.

In an embodiment of the invention which has been selected for the purpose of illustrating the device there is shown a stationary frame indicated generally by the reference character 10 consisting of frame channels 11, 12, 13, and 14. The frame is carried upon I beams 15 and 16 on some stationary support not shown. A band 17 is shown for purposes of mounting fastened to diagonal channels 18 and 19 by some appropriate fastening means such as welding. A filler ring 20 may be employed welded to the top of the band 17 on its other side and welded to a vertical side wall 21 of an upper container indicated generally by the reference character 25. A complementary lower container indicated generally by the reference character 26 is provided with a vertical side wall 27 slidable telescopically over the vertical side wall 21 and located inside of the band 17 which serves as a skirt.

The upper container 25 has a frusto-conical top wall 28 and the frusto-conical top wall 28 together with the vertical side wall 21 encompass an upper chamber 29. A frusto-conical lower wall 30 cooperates with the vertical side wall 27 of the lower container 26 to provide a lower chamber 31. It will be clear from the foregoing explanation that the volume of the device which it is capable of metering is the aggregate of the two chambers, namely the upper chamber 25 and the lower chamber 31, and that the aggregate volume can be changed to different amounts depending upon the relative positions of the upper and lower container with respect to each other. In all of said positions the chambers are effectively closed by the overlapping relationship of the vertical side walls 21 and 27.

In the chosen embodiment of the device, it has been found more convenient to move the lower container 26 up and down relative to the upper container 25 and to hold the upper container 25 in stationary position. To make this movement possible, the lower container 26 is mounted upon a frame indicated generally by the reference character 32 which is in all material respects substantially similar to the frame 10. The lower frame consists of four frame channels, the frame channel 33, lying behind the frame channel 34, and the frame channels 35 and 36. The lower container 26 is fastened to the lower frame 32 by any appropriate conventional means as for example by welding. In this fashion, the lower frame is entirely free and adapted to be moved up and down, thereby moving the lower container 26 upwardly when a smaller volume is to be metered and downwardly when a larger volume is to be metered.

To accomplish the up and down movement made reference to, power actuated jacks 37 and 38 are made use of driven by an electric motor 39, the motor 39 being mounted upon a supporting bracket 39' carried by the upper frame 10.

Each of the jacks 37 and 38 consists of a lower part appropriately designated as a screw shaft 40 and upper part consisting of a collar 41 within which may be employed a worm gear (not shown) on a shaft 42. For convenience, a common shaft 43 interconnects the shafts 42 by means of couplings 44 and enables both power actuated jacks 37 and 38 to be operated from the same driven shaft 45 and motor 39. Where there is a direct drive as shown, the collar 44 may house a gear reducer in each case (not shown) so that manipulation of the jacks will be gradual and so that there will be substantial mechanical advantage present. The screw shafts 40 are securely fastened by appropriate means such as plates 46 and bolts 47 to the lower frame 32. To protect the common shaft 43 a tube 48 may extend through the frusto-conical top wall 28 as shown and be welded at its outer ends to the top wall, the tube 48 being substantially larger than the exterior diameter of the common shaft 43 so that it can rotate freely at all times.

To improve the ease and steadiness of lifting and lowering of the lower frame 32 and its lower container 26, guide shafts 49 may be employed, fastened by means of an appropriate plate 50 and bolts 51 to the frame 32, the guide shafts extending slidably through bushings 52 on appropriate sides of the upper frame 10.

For admitting material into the combined chambers 29 and 31 there is provided a hopper 55 which has at the bottom a supply section 56 which empties into the upper ends of the upper chamber 29. To be able to shut off and open the discharge section there is provided a plate 57 which serves as a gate. The gate is adapted to slide upon rollers fastened by means of appropriate bolts 59 and nuts 60 to adjacent respective parts 61 and 62 of the discharge section 56. A skirt 63 at the lower end of the hopper 55 almost touches at its edge upon the upper face of the plate 57 but still remains clear enough so that the plate can slide freely. A keeper 64 is able to hold the plate 57 down in proper position when the plate slides under it. To move the plate in and out between closed position and open position a bracket 65 at one end of the plate has attached thereto the piston rod 66 of a power cylinder 67 whereby the plate 57 can be pulled outwardly over the rollers 58 to open position and by the same means put back into the closed position shown in FIGURE 1. A similar plate (not shown) is located immediately below a discharge section 70, being mounted between appropriate parts 71 on opposite sides of the discharge section 70. The plate in the discharge section 70 (not shown) is operated in a similar fashion by means of a piston rod 72 attached to an appropriate hydraulic power cylinder (not shown).

In operation the upper and lower containers 25 and 26 are telescoped together in the relationship shown generally in FIGURE 1. To operate at largest capacity the lower container 26 is at its lowermost position below the upper container 25 and in that position there is still some degree of overlap between the vertical wall section 27 of the lower container and the corresponding vertical side wall 21 of the upper container 25. Should a lesser amount of material need to be metered, an appropriate adjustment can be made by elevating the lower container 26 with respect to the upper container. This is accomplished by moving the lower frame 32 upwardly by manipulating the screw shafts 40. This naturally is accomplished by operating the electric motor 39 and its drive shaft 45 whereby the screw shafts 40 when acted upon by appropriate mechanism heretofore described in the collars 41 acts upon the two screw shafts thereby to raise the lower frame 32 and the lower container 26 which is mounted upon it. While this takes place the vertical side wall 27 slides upwardly within a pocket 73 on the outside of the vertical side wall 21 to an appropriate upper limit or somewhere partway between. This, of course, diminishes the combined volume of the upper chamber 29 and lower chamber 31 within the limits of capacity of the machine. Naturally, for a larger volume the operation can be reversed, lowering the lower container 26 with respect to the upper container 25. By some appropriate gauge means (not shown) the setting for the device within its capability can be measured on one or another of the side walls, preferably the vertical side wall 27.

After the relationship of the containers has been properly set the plate 57 forming the supply gate is opened by manipulation of the hydraulic power cylinder 67 and material permitted to flow until the two chambers 29 and 31 are completely filled to the level of the upper plate 57. At this point the plate can be closed by the same hydraulic cylinder which opened it and the material will occupy the two chambers to the selected capacity. Then the lower gate can be opened by manipulation of the appropriate hydraulic piston rod 72 and the entire contents will flow outwardly from a discharge end 74. After the device has been emptied the appropriate plate in the discharge section 70 is closed, the plate 57 is opened and the device is ready for another metering operation.

It is of course entirely possible to change the capacity of the two chambers at any time by starting operation of the electric motor 39 in the proper direction.

From the foregoing description it will be clear that the material which is metered by the device is entirely sealed within the device while it is being metered and also while it is being placed therein and discharged therefrom. In this manner, no matter how finely powdered the material may be, it is prevented from reaching the atmosphere. The sealed relationship of the telescoping side walls is instrumental in properly confining the material as well as providing a closed container wherein the precise amount can be measured by volume in each instance, irrespective of weight.

It is now evident that the upper and lower containers 25 and 26 together form a receiver having an internal metering chamber 29, 31 with an upper material inlet 56 and a lower material outlet 70. The effective volume of this metering chamber is adjustable to meter a preset volume of material by axial adjustment of the lower chamber wall 27, 30, relative to the upper chamber wall 21, 28. The tapered shape of the upper and lower wall extremities 28, 30 is highly beneficial. Thus, when introducing material into the receiver through the upper inlet 56, the material tends to form a mound below the inlet which eventually rises to the level of and blocks the inlet. If the upper wall of the receiver were cylindrical, a substantial void would exist within the receiver when the rising mound of material reached the inlet. This void would introduce an error into the metering operation of the device since the volume of the void might, and very likely would, vary from one metering cycle to the next. Such metering error is minimized or eliminated in the illustrated metering device for the reason that the tapered upper wall 28 of the receiver conforms generally to the shape of the mound which is formed by the material introduced into the receiver through the inlet 56. Accordingly, little if any void space exists within the receiver when the mound of material rises to the level of the inlet. The lower tapered wall 30 of the receiver also aids in minimizing or eliminating metering error in the metering device. Thus, the taper of the latter wall effects complete discharge of the entire volume of material from the receiver at the conclusion of each metering cycle.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A volumetric metering device comprising a receiver having a normally generally vertical axis and relatively axially movable normally upper and lower chamber walls disposed in sealing relation so as to define a closed metering chamber, there being a material inlet in the upper end of said receiver and a material outlet in the lower end of the said receiver, a material supply gate mounted on the upper end of said receiver for selectively opening and closing said inlet, a material discharge gate mounted on the lower end of said receiver for selectively opening and closing said outlet, a pair of rotary jacks mounted on one of said chamber walls at diametrically opposite sides thereof and operatively connected to the other chamber wall for relatively axially moving said chamber walls, a rotary drive shaft extending diametrically through said one chamber wall, means drivably coupling said shaft to said jacks, whereby rotation of said shaft is effective to drive said jacks in unison, thereby to vary the effective volume of said metering chamber, and a motor drivably coupled to said shaft.

2. A metering device according to claim 1 including a sleeve surrounding said shaft and sealed at its ends to said one chamber wall.

3. A volumetric metering device comprising a receiver having a normally generally vertical axis and relatively axially movable normally upper and lower chamber walls, the lower portion of said upper chamber wall being disposed in telescopic sealing relation with the upper portion of said lower chamber wall, a relatively stationary frame surrounding said lower portion of and rigidly secured to said upper chamber wall, a relatively movable frame surrounding and rigidly secured to said lower chamber wall adjacent said upper portion of the latter wall, means operatively connected between said frames for relatively axially adjusting said lower chamber wall relative to said upper chamber wall to vary the effective volume of said metering chamber, there being a material inlet in the upper end of said receiver and a material outlet in the lower end of said receiver, a material supply gate mounted on the upper end of said receiver for selectively opening and closing said inlet, and a material discharge gate mounted on the lower end of said receiver for selectively opening and closing said outlet.

4. A volumetric metering device comprising a receiver having a normally generally vertical axis and relatively axially movable normally upper and lower chamber walls, said upper chamber wall having an upper tapered portion and a lower cylindrical portion, said lower chamber wall having a lower tapered portion and an upper cylindrical portion, said cylindrical chamber wall portions being disposed in telescopic sealing relation so as to define a metering chamber having a midsection and upper and lower extremities, said receiver having an upper coaxial opening defining a material inlet to said upper chamber extremity and a lower coaxial opening defining a material outlet from said lower chamber extremity, the cross-sectional area of said chamber midsection being many times greater than the cross-sectional area of either opening, said tapered portion of said upper chamber wall tapering toward said axis from said cylindrical portion of said upper wall to said inlet, said tapered portion of said lower chamber wall tapering toward said axis from said cylindrical portion of said lower chamber wall to said outlet, a material supply gate mounted on the upper end of said receiver for selectively opening and closing said inlet, a material discharge gate mounted on the lower end of said receiver for selectively opening and closing said outlet, a relatively stationary frame surrounding said cylindrical portion of and rigidly joined to said upper chamber wall, a relatively movable frame surrounding and rigidly joined to said lower chamber wall adjacent said cylindrical portion of the latter wall, a pair of rotary jacks mounted on said stationary frame at diametrically opposite sides of said upper chamber wall and including parts connected to said movable frame, a drive shaft extending diametrically through said upper chamber wall, means drivably coupling said shaft to said jacks, whereby rotation of said shaft is effective to drive said jacks in unison, thereby to axially adjust said lower chamber wall with respect to said upper chamber wall to vary the effective volume of said metering chamber, and a motor mounted on said stationary frame and drivably coupled to said shaft.

References Cited by the Examiner

UNITED STATES PATENTS

| | | | |
|---|---|---|---|
| 1,329,472 | 2/1920 | Oberste et al. | 222—450 X |
| 1,553,361 | 9/1922 | Butler. | |
| 1,723,234 | 8/1929 | Gwynne et al. | 222—440 X |
| 2,429,154 | 10/1947 | Ayars | 222—440 |
| 2,742,201 | 4/1956 | Hartley | 222—440 |
| 3,100,584 | 8/1963 | Bauder | 222—55 |

RAPHAEL M. LUPO, *Primary Examiner.*

HADD S. LANE, LOUIS J. DEMBO, *Examiners.*